Figures 1, 2:
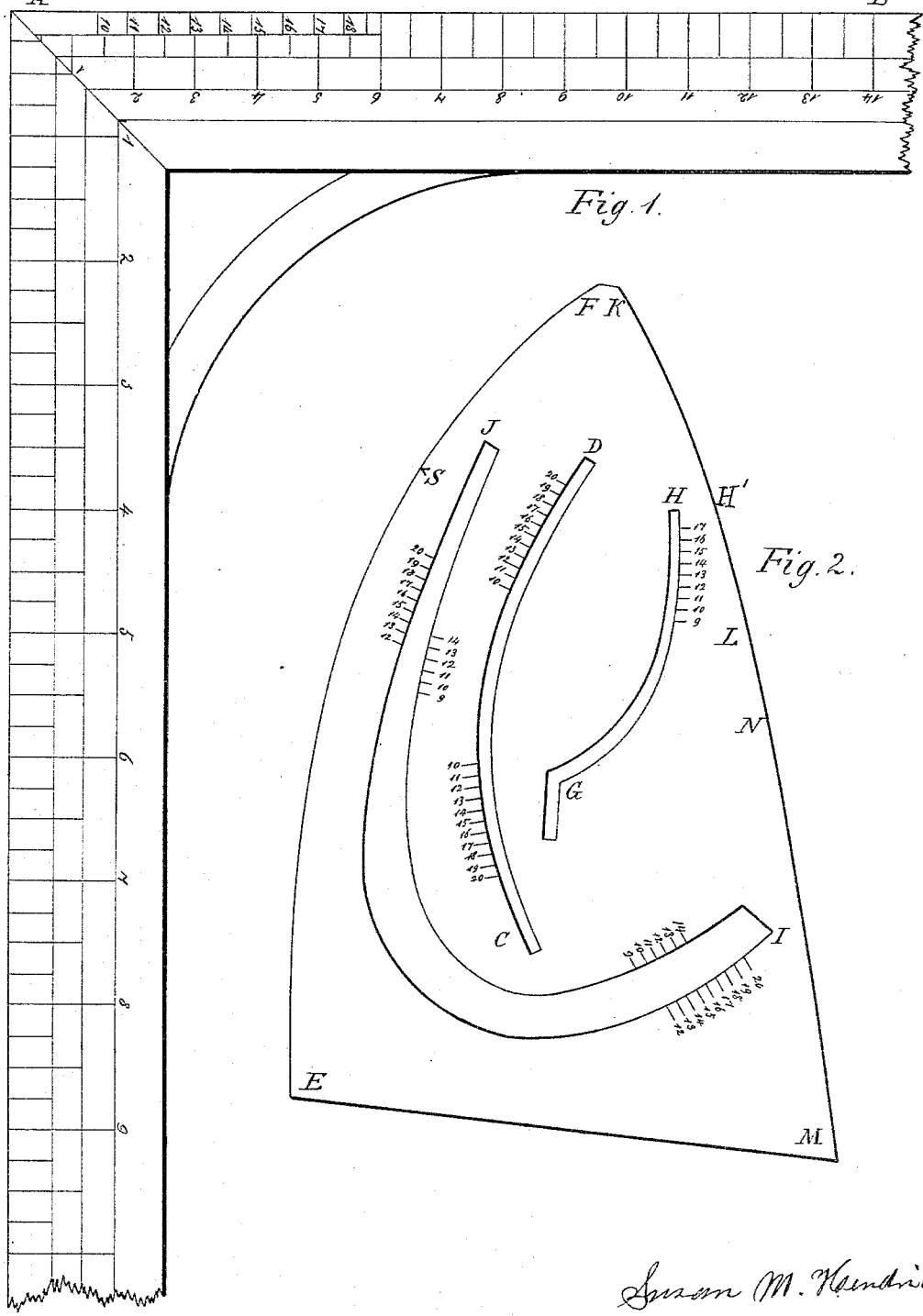

(No Model.)

S. M. HENDRICK.
SYSTEM AND DEVICE FOR MEASURING GARMENTS.

No. 325,409. Patented Sept. 1, 1885.

WITNESSES
Wm. N. Lowe
Benj. S. Morehouse

INVENTOR
Susan M. Hendrick
by G. W. Morrill Atty.

UNITED STATES PATENT OFFICE.

SUSAN M. HENDRICK, OF NEW YORK, N. Y.

SYSTEM AND DEVICE FOR MEASURING GARMENTS.

SPECIFICATION forming part of Letters Patent No. 325,409, dated September 1, 1885.

Application filed January 15, 1885. (No model.)

*To all whom it may concern:*

Be it known that I, SUSAN M. HENDRICK, a citizen of the United States, and a resident of New York, in the county of New York and State of New York, have invented certain new and useful Improvements in Systems and Devices for Measuring Garments, of which the following is a specification.

My invention relates, especially, to systems, devices, or charts for fitting garments; and it has for its object the provision of a device and system simple, cheap, and by which any portion of the body may be accurately measured, and the complete measurement for a garment be taken with absolute certainty and great saving of time.

My invention consists, essentially, in a metal plate provided with perforations therein and with a scale of measurements, all of which will be hereinafter first fully described, and then pointed out in the claim.

In the drawings, Figure 1 shows a simple square constructed of any approved material, and marked with whole, half, and quarter inches. Fig. 2 is a metal plate perforated and marked with the requisite figures.

The square is employed for getting the straight-line measurements, and has the scale for the back of the neck at A. The half-inches from A to B are employed for securing the bust and waist measurement. Fig. 2 embraces all necessary scales and curves to complete the drafting of the garment. The curve from C to D gives back of arm-size; curve from E to F gives back-form seam, and the same curve from S, measuring toward E, gives shoulder; curve from G to H gives front-neck curve; from I to J gives front arm-size; from H' to F is employed for all biases; from M to N gives under-arm seams, and from N to M gives all biases below the waist, and also all the back-seams below the waist; from K to N givee curved seam over the hips below the waist.

My device is employed as follows: The bust-measure is taken straight around the body close up under the arms, the tape being drawn as tightly as the garment is required to fit; measure around the bottom of the waist, then pass the tape around the waist, letting it remain, and get length of front of waist by placing the tape at the neck as high as the garment is required, and pass it down the front of the waist to the lower edge of the tape; get the length of the back in the same manner; get the measurement under the arms by putting the tape closely up thereunder and pass down to the edge of the tape; get the width of the back by measuring across the back from one arm-size to the other. The measurement being taken from the centers of the arm-size, get the width of the front in the same way over the fullest part of the bust. Next measure neck, length of shoulders, and arm-sizes, and for all garments that extend below the waist take the hip measurement five inches below the waist. To take measure for the sleeve, for inside measure from arm-size to wrist, on outside from arm-size to elbow and from elbow to wrist, and measure around the arm half-way between arm-size and elbow and half-way between elbow and wrist.

Having ascertained all the measurements without leaving one point for "guess-work," first draft the back by placing the square upon the material from which the garment is to be cut, and get the back of the neck with the neck-scale; get the length of the back of the waist in inches on the square corresponding with the measure for length of back. At this point draw a line straight across the bottom of the waist, and get the measure for the back of the waist in half-inches on the square. Next measure up from this point for the length of the waist under the arms. Then get the width of the back from the arms across the waist to upper point of under-arm seam and lower point of arm-size. Then with curve for under-arm seam draw said seam, and, with lowest number on curve for back arm-size corresponding with measure for arm-size placed at upper part of under-arm seam, get back of arm-size by drawing curve from that number to corresponding numbers on upper part of curve. This will be the lowest point of shoulder-slope.

To get the shoulders, place the plate so that the letter S on the shoulder-curve strikes the neck-line, and draw to the upper part of the arm-size. Then place the bottom of the back-form curve at the bottom of the waist, and draw to the centers of the arm-sizes. This gives the curved seam in the back. Now get the seams below the waist with the curve for under-arm seams, and below the waist with curve for under-arm seams reversed. This completes the back.

To get the front of the garment, draft the neck first, then straight down the front and across the bottom of the waist, having all the lines correspond with the measurements taken for that part. Then measure straight up for length under the arms to the lower part of the arm-size, and get the arm-size the same as for the back, only using the curve for the front arm-size, and get the shoulders the same as the back. Get the biases with the bias-scale, according to the measurements taken for that purpose. Mark the under-arm seams with the curve for said seams, and draw the biases below the waist with bias-curve reversed. Get the front under-arm seams below the waist with point of bias curve or scale at the waist.

Having now fully described my invention, what I claim as new therein, and desire to secure by Letters Patent, is—

The plate having back-arm curve C to D, curve E to F for back-form seam, S to E for shoulders, G to H for front-neck curve, I to J for front arm-size, H' to F for bias-seams, M to N for under-arm seams, N to M for bias below the waist, and H' to N for seams over the hip, the whole arranged substantially as and for the uses and purposes shown and described.

Signed at New York city, in the county of New York and State of New York, this 14th day of January, A. D. 1884.

SUSAN M. HENDRICK.

Witnesses:
G. W. MORRILL,
M. P. HOLMES.